US009704194B2

(12) United States Patent
Grove et al.

(10) Patent No.: US 9,704,194 B2
(45) Date of Patent: Jul. 11, 2017

(54) METHOD AND SYSTEM TO GENERATE A LISTING IN A NETWORK-BASED COMMERCE SYSTEM

(71) Applicant: eBay Inc., San Jose, CA (US)

(72) Inventors: Steve Grove, San Jose, CA (US); Larry Cornett, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/318,525

(22) Filed: Jun. 27, 2014

(65) Prior Publication Data

US 2014/0372244 A1  Dec. 18, 2014

Related U.S. Application Data

(63) Continuation of application No. 10/648,125, filed on Aug. 25, 2003, now Pat. No. 8,819,039.

(60) Provisional application No. 60/437,199, filed on Dec. 31, 2002.

(51) Int. Cl.
| | |
|---|---|
| *G06F 17/30* | (2006.01) |
| *G06Q 30/08* | (2012.01) |
| *G06Q 30/06* | (2012.01) |

(52) U.S. Cl.
CPC ............ *G06Q 30/08* (2013.01); *G06Q 30/06* (2013.01)

(58) Field of Classification Search
CPC ......... G06F 17/30864; G06F 17/30867; G06F 17/3087; G06F 17/30067; G06Q 10/10; G06Q 30/02; G06Q 30/06
See application file for complete search history.

(56) References Cited

U.S. PATENT DOCUMENTS

| | | | |
|---|---|---|---|
| 5,537,586 A | 7/1996 | Amram et al. | |
| 5,740,425 A | 4/1998 | Povilus | |
| 5,822,123 A | 10/1998 | Davis et al. | |

(Continued)

FOREIGN PATENT DOCUMENTS

| | | |
|---|---|---|
| EP | 1841195 A1 | 10/2007 |
| WO | WO-2007061975 A2 | 5/2007 |

OTHER PUBLICATIONS

"U.S. Appl. No. 11/426,993, Response filed Apr. 15, 2015 to Non Final Office Action mailed Dec. 15, 2014", 21 pgs.

(Continued)

*Primary Examiner* — Cam-Y Truong
(74) *Attorney, Agent, or Firm* — Schwegman Lundberg & Woessner, P.A.

(57) ABSTRACT

Generating a listing in a network-based commerce system Listing identification data is received from a user, and listing data associated with the listing, based on the listing identification data, is retrieved. Thereafter, a listing is generated that is at least partially based on the listing data tier posting on the network-based commerce system. In one embodiment, the user may edit the listing data prior to the listing being posted. The network-based commerce system may include a database of listing data associated with at least one of movies, music, games, books and motor vehicles. In one embodiment, the proposed listing comprises a plurality of check boxes each of which is associated with an attribute of the listing and the system automatically, without human intervention, checks attributes based on the listing data. The editing by the user may include the user selecting one or more of the check boxes.

17 Claims, 20 Drawing Sheets

(56) References Cited

U.S. PATENT DOCUMENTS

| | | | |
|---|---|---|---|
| 5,844,554 A * | 12/1998 | Geller et al. | 715/744 |
| 5,950,173 A | 9/1999 | Perkowski | |
| 6,029,141 A | 2/2000 | Bezos et al. | |
| 6,044,363 A | 3/2000 | Mori et al. | |
| 6,119,101 A | 9/2000 | Peckover | |
| 6,122,648 A | 9/2000 | Roderick | |
| 6,144,958 A | 11/2000 | Ortega et al. | |
| 6,151,601 A | 11/2000 | Papierniak et al. | |
| 6,216,264 B1 | 4/2001 | Maze et al. | |
| 6,230,156 B1 | 5/2001 | Hussey | |
| 6,266,649 B1 | 7/2001 | Linden et al. | |
| 6,401,084 B1 | 6/2002 | Ortega et al. | |
| 6,410,084 B1 | 6/2002 | Klare et al. | |
| 6,598,026 B1 | 7/2003 | Ojha et al. | |
| 6,631,522 B1 * | 10/2003 | Erdelyi | 725/53 |
| 6,641,037 B2 | 11/2003 | Williams | |
| 6,697,800 B1 | 2/2004 | Jannink et al. | |
| 6,697,823 B2 | 2/2004 | Otsuka et al. | |
| 6,697,824 B1 | 2/2004 | Bowman-Amuah | |
| 6,853,982 B2 | 2/2005 | Smith et al. | |
| 6,904,410 B1 | 6/2005 | Weiss et al. | |
| 6,928,425 B2 | 8/2005 | Grefenstette et al. | |
| 7,228,298 B1 | 6/2007 | Raines | |
| 7,295,995 B1 | 11/2007 | York et al. | |
| 7,366,721 B1 | 4/2008 | Bennett et al. | |
| 7,886,156 B2 | 2/2011 | Franchi | |
| 8,086,502 B2 | 12/2011 | Krishnamurthy et al. | |
| 8,194,985 B2 | 6/2012 | Grigsby et al. | |
| 8,260,656 B1 * | 9/2012 | Harbick | G06Q 30/02 705/26.7 |
| 8,301,512 B2 | 10/2012 | Hamilton et al. | |
| 8,306,872 B2 | 11/2012 | Inoue et al. | |
| 8,402,068 B2 | 3/2013 | Clendinning et al. | |
| 8,489,438 B1 | 7/2013 | Ibrahim | |
| 8,768,937 B2 | 7/2014 | Clendinning et al. | |
| 8,819,039 B2 | 8/2014 | Grove et al. | |
| 8,849,693 B1 * | 9/2014 | Koyfman et al. | 705/14.1 |
| 9,076,173 B2 | 7/2015 | Hamilton et al. | |
| 9,171,056 B2 | 10/2015 | Clendinning et al. | |
| 2002/0026353 A1 | 2/2002 | Porat et al. | |
| 2002/0052801 A1 * | 5/2002 | Norton | G06Q 30/06 705/26.43 |
| 2002/0082893 A1 | 6/2002 | Barts et al. | |
| 2002/0082953 A1 | 6/2002 | Batham et al. | |
| 2002/0083448 A1 | 6/2002 | Johnson | |
| 2002/0154157 A1 | 10/2002 | Sherr et al. | |
| 2003/0033216 A1 * | 2/2003 | Benshemesh | G06Q 30/06 705/26.44 |
| 2003/0036964 A1 * | 2/2003 | Boyden et al. | 705/26 |
| 2003/0061147 A1 * | 3/2003 | Fluhr et al. | 705/37 |
| 2003/0083961 A1 | 5/2003 | Bezos et al. | |
| 2003/0105682 A1 | 6/2003 | Dicker et al. | |
| 2003/0110100 A1 * | 6/2003 | Wirth, Jr. | G06Q 30/02 705/27.2 |
| 2003/0204449 A1 * | 10/2003 | Kotas | G06Q 30/02 707/781 |
| 2003/0216971 A1 | 11/2003 | Sick et al. | |
| 2004/0128320 A1 | 7/2004 | Grove et al. | |
| 2004/0210479 A1 | 10/2004 | Perkowski et al. | |
| 2004/0243485 A1 | 12/2004 | Borenstein et al. | |
| 2005/0251409 A1 | 11/2005 | Johnson et al. | |
| 2006/0031216 A1 | 2/2006 | Semple et al. | |
| 2006/0085477 A1 | 4/2006 | Phillips et al. | |
| 2006/0106683 A1 | 5/2006 | Fisher et al. | |
| 2006/0143158 A1 | 6/2006 | Ruhl et al. | |
| 2006/0190352 A1 | 8/2006 | Zeidman | |
| 2007/0112968 A1 | 5/2007 | Schwab | |
| 2007/0118441 A1 | 5/2007 | Chatwani et al. | |
| 2007/0179848 A1 | 8/2007 | Jain et al. | |
| 2007/0260495 A1 | 11/2007 | Mace et al. | |
| 2008/0059331 A1 | 3/2008 | Schwab | |
| 2009/0113475 A1 | 4/2009 | Li | |
| 2009/0304267 A1 | 12/2009 | Tapley et al. | |
| 2010/0076867 A1 | 3/2010 | Inoue et al. | |
| 2010/0086192 A1 | 4/2010 | Grigsby et al. | |
| 2010/0214302 A1 | 8/2010 | Melcher et al. | |
| 2011/0099085 A1 | 4/2011 | Hamilton et al. | |
| 2012/0265744 A1 | 10/2012 | Berkowitz et al. | |
| 2013/0198183 A1 | 8/2013 | Clendinning et al. | |
| 2013/0297437 A1 | 11/2013 | Hamilton et al. | |
| 2014/0304220 A1 | 10/2014 | Clendinning et al. | |
| 2015/0310525 A1 | 10/2015 | Hamilton et al. | |
| 2016/0027086 A1 | 1/2016 | Clendinning et al. | |

OTHER PUBLICATIONS

"U.S. Appl. No. 13/663,178, Notice of Allowance mailed Mar. 3, 2015", 10 pgs.

"U.S. Appl. No. 14/306,185, Non Final Office Action mailed Jan. 30, 2015", 5 pgs.

"U.S. Appl. No. 14/306,185, Response filed Apr. 30, 2015 to Non Final Office Action mailed Jan. 30, 2015", 6 pgs.

"U.S. Appl. No. 11/426,993, Final Office Action mailed Jun. 30, 2015", 8 pgs.

"U.S. Appl. No. 14/306,185, Notice of Allowance mailed May 28, 2015", 6 pgs.

"U.S. Appl. No. 11/426,993, Non Final Office Action mailed Jan. 14, 2016", 8 pgs.

"U.S. Appl. No. 11/426,993, Response filed Oct. 30, 2015 to Final Office Action mailed Jun. 30, 2015", 16 pgs.

"U.S. Appl. No. 14/792,133, Notice of Non-Compliant Amendment mailed Oct. 20, 2015", 2 pgs.

"U.S. Appl. No. 14/792,133, Preliminary Amendment filed Oct. 8, 2015".

"U.S. Appl. No. 14/792,133, Response to Notice of Non-Compliant Amendment filed Oct. 26, 2015", 5 pgs.

"U.S. Appl. No. 09/730,538, Advisory Action mailed May 9, 2007", 3 pgs.

"U.S. Appl. No. 09/730,538, Advisory Action mailed Aug. 7, 2007", 3 pgs.

"U.S. Appl. No. 09/730,538, Advisory Action mailed Dec. 23, 2003", 2 pgs.

"U.S. Appl. No. 09/730,538, Amendment filed Sep. 20, 2012", 16 pgs.

"U.S. Appl. No. 09/730,538, Amendment Under 37 CFR 41.33 mailed Jul. 30, 2007", 8 pgs.

"U.S. Appl. No. 09/730,538, Appeal Brief filed Aug. 2, 2007", 30 pgs.

"U.S. Appl. No. 09/730,538, Decision on Appeal mailed Jul. 20, 2012", 6 pgs.

"U.S. Appl. No. 09/730,538, Examiners Answer mailed Jun. 23, 2009", 9 pgs.

"U.S. Appl. No. 09/730,538, Examiners Answer mailed Jul. 21, 2009", 9 pgs.

"U.S. Appl. No. 09/730,538, Final Office Action mailed Feb. 28, 2007", 8 pgs.

"U.S. Appl. No. 09/730,538, Final Office Action mailed Apr. 3, 2006", 9 pgs.

"U.S. Appl. No. 09/730,538, Final Office Action mailed Aug. 11, 2003", 7 pgs.

"U.S. Appl. No. 09/730,538, Final Office Action mailed Dec. 7, 2004", 8 pgs.

"U.S. Appl. No. 09/730,538, Non Final Office Action mailed Feb. 6, 2004", 7 pgs.

"U.S. Appl. No. 09/730,538, Non Final Office Action mailed May 4, 2005", 8 pgs.

"U.S. Appl. No. 09/730,538, Non Final Office Action mailed Sep. 19, 2006", 8 pgs.

"U.S. Appl. No. 09/730,538, Non-Final Office Action mailed Feb. 27, 2003", 6 pgs.

"U.S. Appl. No. 09/730,538, Notice of Allowance mailed Nov. 5, 2012", 16 pgs.

"U.S. Appl. No. 09/730,538, Pre-Appeal Brief Request filed May 29, 2007", 5 pgs.

"U.S. Appl. No. 09/730,538, Response filed Jan. 17, 2006 to Non-Final Office Action mailed May 4, 2005", 19 pgs.

(56) References Cited

OTHER PUBLICATIONS

"U.S. Appl. No. 09/730,538, Response filed Mar. 7, 2005 to Final Office Action mailed Dec. 7, 2004", 19 pgs.
"U.S. Appl. No. 09/730,538, Response filed Apr. 30, 2007 to Final Office Action mailed Feb. 28, 2007", 18 pgs.
"U.S. Appl. No. 09/730,538, Response filed May 27, 2003 to Non Final Office Action mailed Feb. 27, 2003", 11 pgs.
"U.S. Appl. No. 09/730,538, Response filed May 28, 2004 to Non-Final Office Action mailed Feb. 6, 2004", 17 pgs.
"U.S. Appl. No. 09/730,538, Response filed Jul. 3, 2006 to Final Office Action mailed Apr. 3, 2006", 17 pgs.
"U.S. Appl. No. 09/730,538, Response filed Aug. 1, 2005 to Non Final Office Action mailed May 4, 2005", 16 pgs.
"U.S. Appl. No. 09/730,538, Response filed Nov. 25, 2003 to Final Office Action mailed Aug. 11, 2003", 19 pgs.
"U.S. Appl. No. 09/730,538, Response filed Nov. 30, 2006 to Non Final Office Action mailed Sep. 19, 2006", 14 pgs.
"U.S. Appl. No. 09/730,538, Response to Notice of Non-Compliant Appeal Brief filed Jan. 14, 2008", 17 pgs.
"U.S. Appl. No. 10/648,125, Advisory Action mailed Feb. 11, 2009", 3 pgs.
"U.S. Appl. No. 10/648,125, Advisory Action mailed Jun. 9, 2005", 4 pgs.
"U.S. Appl. No. 10/648,125, Appeal Brief filed Jul. 16, 2010", 35 pgs.
"U.S. Appl. No. 10/648,125, Appeal Decision mailed Jan. 30, 2014", 12 pgs.
"U.S. Appl. No. 10/648,125, Decision on Pre-Appeal Brief Request mailed Apr. 16, 2010", 2 pgs.
"U.S. Appl. No. 10/648,125, Examiner Interview Summary filed Jun. 12, 2014", 1 pg.
"U.S. Appl. No. 10/648,125, Examiner Interview Summary mailed Jan. 6, 2006", 3 pgs.
"U.S. Appl. No. 10/648,125, Examiner Interview Summary mailed Mar. 28, 2014", 2 pgs.
"U.S. Appl. No. 10/648,125, Examiner Interview Summary mailed Oct. 16, 2008", 2 pgs.
"U.S. Appl. No. 10/648,125, Examiners Answer to Appeal Brief mailed Oct. 14, 2010", 47 pgs.
"U.S. Appl. No. 10/648,125, Final Office Action mailed Jan. 4, 2010", 39 pgs.
"U.S. Appl. No. 10/648,125, Final Office Action mailed Jan. 9, 2006", 29 pgs.
"U.S. Appl. No. 10/648,125, Final Office Action mailed Mar. 24, 2005", 19 pgs.
"U.S. Appl. No. 10/648,125, Final Office Action mailed Jul. 24, 2007", 27 pgs.
"U.S. Appl. No. 10/648,125, Final Office Action mailed Oct. 10, 2008", 56 pgs.
"U.S. Appl. No. 10/648,125, Final Office Action mailed Dec. 4, 2008", 33 pgs.
"U.S. Appl. No. 10/648,125, Non Final Office Action mailed Feb. 21, 2008", 53 pgs.
"U.S. Appl. No. 10/648,125, Non Final Office Action mailed May 13, 2009", 36 pgs.
"U.S. Appl. No. 10/648,125, Non Final Office Action mailed Aug. 25, 2005", 14 pgs.
"U.S. Appl. No. 10/648,125, Non Final Office Action mailed Sep. 1, 2004", 22 pgs.
"U.S. Appl. No. 10/648,125, Non Final Office Action mailed Dec. 7, 2006", 27 pgs.
"U.S. Appl. No. 10/648,125, Notice of Allowance mailed Apr. 21, 2014", 14 pgs.
"U.S. Appl. No. 10/648,125, Pre-Appeal Brief Request mailed Mar. 4, 2010", 5 pgs.
"U.S. Appl. No. 10/648,125, Reply Brief filed Mar. 26, 2014", 65 pgs.
"U.S. Appl. No. 10/648,125, Reply Brief filed Nov. 2, 2010", 10 pgs.
"U.S. Appl. No. 10/648,125, Response filed Jan. 3, 2005 to Non Final Office Action mailed Sep. 1, 2004", 18 pgs.
"U.S. Appl. No. 10/648,125, Response filed Feb. 4, 2009 to Final Office Action mailed Dec. 4, 2008", 13 pgs.
"U.S. Appl. No. 10/648,125, Response filed Mar. 4, 2009 to Final Office Action mailed Dec. 4, 2008", 14 pgs.
"U.S. Appl. No. 10/648,125, Response filed May 7, 2007 to Non Final Office Action mailed Dec. 7, 2006", 14 pgs.
"U.S. Appl. No. 10/648,125, Response filed May 24, 2005 to Final Office Action mailed Mar. 24, 2005", 21 pgs.
"U.S. Appl. No. 10/648,125, Response filed Jun. 23, 2008 to Non Final Office Action mailed Feb. 21, 2008", 19 pgs.
"U.S. Appl. No. 10/648,125, Response filed Jul. 10, 2006 to Final Office Action mailed Jan. 9, 2006", 14 pgs.
"U.S. Appl. No. 10/648,125, Response filed Jul. 25, 2005 to Advisory Action mailed Jun. 9, 2005", 9 pgs.
"U.S. Appl. No. 10/648,125, Response filed Sep. 14, 2009 to Non Final Office Action mailed May 13, 2009", 14 pgs.
"U.S. Appl. No. 10/648,125, Response filed Oct. 30, 2007 to Final Office Action mailed Jul. 24, 2007", 13 pgs.
"U.S. Appl. No. 10/648,125, Response filed Dec. 16, 2005 to Non Final Office Action mailed Aug. 25, 2005", 9 pgs.
"U.S. Appl. No. 11/426,993, Advisory Action mailed Feb. 12, 2014", 3 pgs.
"U.S. Appl. No. 11/426,993, Final Office Action mailed Jul. 22, 2010", 17 pgs.
"U.S. Appl. No. 11/426,993, Final Office Action mailed Sep. 4, 2013", 14 pgs.
"U.S. Appl. No. 11/426,993, Final Office Action mailed Sep. 16, 2011", 16 pgs.
"U.S. Appl. No. 11/426,993, Final Office Action mailed Nov. 7, 2012", 14 pgs.
"U.S. Appl. No. 11/426,993, Non Final Office Action mailed Feb. 24, 2010", 22 pgs.
"U.S. Appl. No. 11/426,993, Non Final Office Action mailed Mar. 29, 2013", 15 pgs.
"U.S. Appl. No. 11/426,993, Non Final Office Action mailed May 23, 2014", 19 pgs.
"U.S. Appl. No. 11/426,993, Non Final Office Action mailed Jun. 21, 2012", 17 pgs.
"U.S. Appl. No. 11/426,993, Non Final Office Action mailed Dec. 15, 2014", 6 pgs.
"U.S. Appl. No. 11/426,993, Non Final Office Action mailed Dec. 23, 2010", 18 pgs.
"U.S. Appl. No. 11/426,993, Response filed Jan. 7, 2010 to Restriction Requirement mailed Dec. 7, 2009", 5 pgs.
"U.S. Appl. No. 11/426,993, Response filed Feb. 6, 2013 to Final Office Action mailed Nov. 7, 2012", 9 pgs.
"U.S. Appl. No. 11/426,993, Response filed Mar. 4, 2014 to Final Office Action mailed Sep. 4, 2013", 11 pgs.
"U.S. Appl. No. 11/426,993, Response filed Apr. 28, 2010 to Non Final Office Action mailed Feb. 24, 2010", 10 pgs.
"U.S. Appl. No. 11/426,993, Response filed Jun. 23, 2011 to Non Final Office Action mailed Dec. 23, 2010", 8 pgs.
"U.S. Appl. No. 11/426,993, Response filed Jun. 27, 2013 to Non Final Office Action mailed Mar. 29, 2013", 8 pgs.
"U.S. Appl. No. 11/426,993, Response filed Sep. 18, 2012 to Non Final Office Action mailed Jun. 21, 2012", 10 pgs.
"U.S. Appl. No. 11/426,993, Response filed Sep. 23, 2014 to Non Final Office Action mailed May 23, 2014", 13 pgs.
"U.S. Appl. No. 11/426,993, Response filed Oct. 15, 2010 to Final Office Action mailed Jul. 22, 2010", 43 pgs.
"U.S. Appl. No. 11/426,993, Response filed Nov. 4, 2013 to Final Office Action mailed Sep. 4, 2013", 10 pgs.
"U.S. Appl. No. 11/426,993, Response filed Dec. 15, 2011 to Final Office Action mailed Sep. 16, 2011", 9 pgs.
"U.S. Appl. No. 11/426,993, Restriction Requirement Dec. 7, 2009", 8 pgs.
"U.S. Appl. No. 12/605,212, Non Final Office Action mailed Feb. 16, 2012", 11 pgs.
"U.S. Appl. No. 12/605,212, Notice of Allowance mailed Jun. 28, 2012", 12 pgs.

(56) References Cited

OTHER PUBLICATIONS

"U.S. Appl. No. 12/605,212, Response filed May 16, 2012 to Non Final Office Action mailed Feb. 16, 2012", 8 pgs.
"U.S. Appl. No. 13/663,178, Examiner Interview Summary mailed Nov. 28, 2014", 3 pgs.
"U.S. Appl. No. 13/663,178, Non Final Office Action mailed Oct. 3, 2014", 18 pgs.
"U.S. Appl. No. 13/663,178, Response filed Jan. 5, 2015 to Non Final Office Action mailed Oct. 3, 2014", 14 pgs.
"U.S. Appl. No. 13/794,055, Final Office Action mailed Sep. 5, 2013", 6 pgs.
"U.S. Appl. No. 13/794,055, Non Final Office Action mailed Jun. 25, 2013", 6 pgs.
"U.S. Appl. No. 13/794,055, Notice of Allowance mailed Feb. 20, 2014", 6 pgs.
"U.S. Appl. No. 13/794,055, Response filed Feb. 5, 2014 to Final Office Action mailed Sep. 5, 2013", 6 pgs.
"U.S. Appl. No. 13/794,055, Response filed Sug. 27, 2013 to Non Final Office Action mailed Jun. 25, 2013", 7 pgs.
"U.S. Appl. No. 14/306,185, Preliminary Amendment filed Jul. 8, 2014", 6 pgs.
"International Application Serial No. PCT/US03/41543, Demand for Preliminary Examination mailed Jun. 10, 2004", 5 pgs.
"International Application Serial No. PCT/US03/41543, International Preliminary Report mailed Apr. 27, 2005", 6 pgs.
"International Application Serial No. PCT/US03/41543, International Search Report mailed Apr. 14, 2004", 7 pgs.
"International Application Serial No. PCT/US03/41543, Written Opinion mailed Aug. 26, 2004", 9 pgs.
"International Application Serial No. PCT/US2006/044944, International Preliminary Report on Patentability mailed Jun. 5, 2008", 5 pgs.
"International Application Serial No. PCT/US2006/044944, International Search Report mailed May 10, 2007", 2 pgs.
"International Application Serial No. PCT/US2006/044944, Written Opinion mailed May 10, 2007", 3 pgs.
"MyComicShop.com", Search for Mad (Magazine #23 on) #158, [Online]. Retrieved from the Internet: <http://www.mycomicshop.com/search?tid=353271&pgi=151>, (Accessed Feb. 10, 2012), 22 pgs.
"New Text and Social Messaging Features Expand Frucall's Voice-Based", Primezone, (Aug. 31, 2006), 1 pg.
Kotas, Paul, et al., "Use of Electronic Catalog to Facilitate User-to-User Sales", U.S. Appl. No. 60/336,409, filed Oct. 31, 2001, 48 pgs.
U.S. Appl. No. 14/306,185, filed Jun. 16, 2014, System and Method for Retrieving and Normalizing Product Information.
U.S. Appl. No. 11/426,993, filed Jun. 28, 2006, Editable Electric Catalogs.
U.S. Appl. No. 13/663,178, filed Oct. 29, 2012, Product Identification Using Multiple Services.
U.S. Appl. No. 14/792,133, filed Jul. 6, 2015, Product Identification Using Multiple Services.

* cited by examiner

44

LISTINGS TABLE

ID

DESCRIPTION

CATEGORY ID

PRICE

CLOSE DATE

RESERVE_PRICE

SELLER_ID

BIDDER_ID (0->N)

LIST_DATE

REMINDER_SENT

```
XYZ Motors
Home    Browse    Sell    Enthusiasts    Search    Services    Help
─────────────────────────────────────────────────────────────────────
Lost your information? Click Refresh . Learn how to stop information loss.
─────────────────────────────────────────────────────────────────────
Sell Your Item: Choose a Listing Option
─────────────────────────────────────────────────────────────────────
1. Catagory      2. Title         3. Pictures      4. Payment       5. Review &
                 & Description    & Details        & Shipping       Submit
─────────────────────────────────────────────────────────────────────

New!  Listing a 1990 or newer vehicle?    (or)  Listing a 1989 or older vehicle?
    Save time listing your vehicle's optiions       Use for older vehicles - OR - if you prefer
    with this new feature.                          the standard listing form.

Enter Vehicle Identification Number (VIN):
152 ─[            ]  [ Continue > ]  ─154           [ Continue > ]
    17 character limit                                    )
    Vehicle Identification Number                       156
      [ WP0AB29911S685546 ]
              Can be found in:
           ○ driver's side dashboard
           ○ driver's side doorjamb
           ○ insurance card or registration
How to find your VIN Number Home    Browse    Sell    Enthusiasts    Search    Services    Help
```

*XYZ Motors*
Home    Browse    Sell    Enthusiasts    Search    Services    Help Lost your information? Click Refresh. Learn how to stop information loss.

Sell Your Item: Choose a Listing Option

1. Category | 2. Title & Description | 3. Pictures & Details | 4. Payment & Shipping | 5. Review & Submit 8 possible styles found for VIN "WX1234987XL0DK2"
Select the one you would like to sell below or try again
Didn't find what you're looking for? List the standard way.

1999 Ford F-150 Series 139" LARIAT Supercab       [Sell one like this]
1999 Ford F-150 Series 157" LARIAT Supercab       [Sell one like this]
1999 Ford F-150 Series FLARESIDE 139" LARIAT Supercab   [Sell one like this]
1999 Ford F-150 Series FLAREDIDE 139" LARIAT Supercab   [Sell one like this]
1999 Ford F-150 Work Series 139" Supercab         [Sell one like this]
1999 Ford F-150 Work Series 157" Supercab         [Sell one like this]
1999 Ford F-150 Series 139" XL Supercab           [Sell one like this]
1999 Ford F-150 Series 157" XL Supercab           [Sell one like this]

Home    Browse    Sell    Enthusiasts    Search    Services    Help

Vehicle Data and Attributes Section

164 — Item Specifics — Change vehicle
2000 Porsche Boxter Roadster 2-door
Vehicle Identification Number (VIN): WPOCA298XYU626870
17 character limit
Milage *: _____ miles — 172
Exterior Color *: [Please choose one ▾] — 174
Interior Color *: [Please choose one ▾] — 176

166 — Standard Equipment *
- ☑ 2 Wheel drive        ☑ 5 Speed
- ☑ Rear Spoiler         ☑ Power Seat Driver
- ☑ Auto Climate Control ☑ Cassette
- ☑ Automatic transmission ☑ Driver Airbag
- ☑ Side air bag         ☑ AM/FM Radio
- ☑ Passenger Airbag     ☑ Cassette
168 —
- ☑ Leather seats        ☑ Convertible
- ☑ Anti Lock Brakes     ☑ Power Windows
- ☑ Power Door Locks 170 — Optional Equipment *
- ☐ After Mkt Options    ☐ Heated Seats
- ☐ CD                   ☐ Integrated Phone
- ☐ CD Changer           ☐ Power Door Locks
- ☐ Cruise Control       ☐ Premium Sound
- ☐ Custom Paint         ☐ Telescoping Wheel
- ☐ Full Leather         ☐ Tonneau
- ☐ Hard Top             ☐ Traction Control
- ☐ Hard Top             ☐ Traction Control Wheels *: [Alloy Wheels (Standard) ▾] — 178
Air conditioning *: [Auto Climate Control ▾] — 180
Package *: [None ▾] — 182
Drivetrain *: [2 Wheel Drive (Standard) ▾] — 184
Transmission *: [5 Speed (Standard) ▾] — 186
Spoiler *: [Rear Spoiler (Standard) ▾] — 188
Power Seat *: [Power Seat Driver (Standard) ▾] — 190

Is there an Existing Warranty? *
○ Vehicle does have an existing warranty. (specify details in Description)
● Vehicle does NOT have an existing warranty.

How do I determine my vehicle's warranty?

Fig. 10

Item Specifics

Change vehicle

1999 Porsche Boxster S 2 - Door 5 CYLINDER 2.7 LITER — 194

Learn more about how
Item Specifics can help
you sell your item.

Vehicle Identification
Number (VIN)     [WPOCA298XYU626870] — 196
                 17 character limit What is a VIN?

Mileage *        [          ] miles

Exterior Color * [Please Choose one ▽]

If in kilometers please
convert to miles.

2000 Porsche: Boxster
Silver on Tan Boxster
Miles:                  19860                          VIN Number:    WPOCA298XYU626870
Engine:                 6 Cylinder 2.7 Liter           Title:         Clear
Transmission:           Automatic                      Interior:      Beige/Tan
Warranty:               Existing                       Exterior:      Silver
Standard Equipment:
ABS                     Convertible                    Power Seat Driver    Alloy Wheels
AM/FM Radio             Dual Air Bags                  Power Steering       Auto Climate Control
Cassette                Leather                        Power Windows        Rear Spoiler
Optional Equipment:
After Market Options    Cruise Control                 Hard Top             Power Door Locks
CD                      Custom Paint                   Heated Seats         Premium Sound
CD Changer              Full Leather                   Integrated Phone     Telescoping Wheel
Condition Report:
No Accident History     Normal Wear on Interior Condition
No Rust                 See Description for Known Mechanical Problems
Like New on Exterior
Seller ......assumes full responsibility for the content of this listing and the item offered.

Vehicle Description
Looks that kill! Performance that Excites! This Year 2000 Boxter is immaculate and in excellent shape. Everyone see's or rides in this Car and give the thumbs up. I ordered it specifically for these colors and "wow" does it look rich. In fact, it drives and performs even richer. If you like the Silver on Tan and you want a car that makes no noise or rattling while only humming to the beauty and purity of the Porsche engine, this is the Car for you. It has been for me. When the top is down you'll enjoy the weather and you will see the world in a whole new way. This Porsche is the Playmate of the 21st Century !!!!

Vehicle Condition
Phenomenal Shape ! Exterior: Not a Dent nor Scratch. Interior: Doesn't look driven. Engine: Purrs like a Kitten.

Terms of Sale
Payment Terms 'I would like a 10% deposit within 3 days of close of auction' Balance to be paid within 10 days of close of auction '' I accept payment by money order' Delivery Terms 'Buyer to pay for shipping of the vehicle' ' I will arrange to deliver the car within 100 miles of Deerfield Beach, FL.'

Close Window

Fig. 12

| Description | | | |
|---|---|---|---|
| 2001 Acura: CL | | | |
| 2001 ACURA CL, Great Condition | | | |
| Miles: | 19000 | VIN Number: | WPOCA296XYU626870 |
| Engine: | 6 Cylinder 2.7 Liter | Title: | Clear |
| Transmission: | Automatic | Interior: | Beige/Tan |
| Warranty: | Existing | Exterior: | Silver |
| | | | |
| Standard Equipment: | | | |
| ABS | Convertible | Power Seat Driver | Alloy Wheels |
| AM/FM Radio | Dual Air Bags | Power Steering | Auto Climate Control |
| Cassette | Leather | Power Windows | Rear Spoiler |
| | | | |
| Optional Equipment: | | | |
| After Market Options | Cruise Control | Hard Top | Power Door Locks |
| CD | Custom Paint | Heated Seats | Premium Sound |
| CD Changer | Full Leather | Integrated Phone | Telescoping Wheel |
| | | | |
| Condition Report: | | | |
| No Accident History | Normal Wear on Interior Condition | | |
| No Rust | See Description for Known Mechanical Problems | | |
| Like New on Exterior | | | |

Seller .......assumes full responsibility for the content of this listing and the item offered.

Trim: 3.2 Coupe 2D Engine: V6 3.2 Liter VTEC transmission: Automatic Drivetrain: Front Wheel Drive Mileage: 35,279 Leather Air Conditioning Power Steering Power Windows Power Mirrors Power Door Locks Dual Powere Seats Moon Roof Cruise Control Tilt Wheel AM/FM Stereo Cassette CD Changer Bose Brand Premium Sound Dual Front Air Bags ABS (4-Wheel) Traction Control Alloy Wheels

| Revise Your Item: Edit Pictures & Item Details | |
|---|---|
| Vehicle Type | Volkswagen Bug |
| Subtitle | Turbo, Sunroof, 5Speed, Dark blue, Spoiler |

Pictures

You have added the following picture(s):

Picture1  Picture2  Picture3

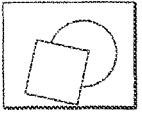  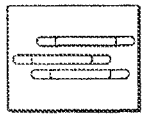

Picture4  Picture5  Picture6

 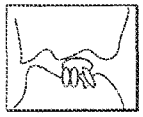 

Increase your item's visibility

Gallery Picture is [Choose One ▼]
(free)

Optional features

| | | | | |
|---|---|---|---|---|
| ✓ | Bold | $4.00 | Attract buyers' attention and set your listing apart - use bold | See example of a bold listing. |
| ☐ | Highlight | $5.00 | Make your listing stand our with a [colored band] | See example of a highlighted listing. |
| ☐ | Category Featured | $14.95 | Show off your listing in the Featured area of category listings and search results | See example of a Category Featured listing. |
| ☐ | Motors Gallery Featured | $99.95 | Get the opportunity to appear in the Featured area of Motors Home and Browse pages.. | Learn more about Motors Gallery Featured. |

Listing icon

⦿ No icon
○  US Flag  $2.00
○  Checkered Flag  $2.00
○  4 x 4  $2.00
○  Gift  $2.00
○  Graduation  $2.00

Free page counter

○ Do not add a counter          ○ Green LED 
⦿ Andale Style 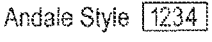   ○ Hidden 

Only seller can see page views

Andale counters show how often your item has been viewed. Learn more.

XYZ Motors
Home    Browse    Sell    Enthusiasts    Search    Services    Help

Lost your information? Click Refresh. Learn how to stop information loss.

Revise Your Item: Describe Your Item

1. Category    2. Title    3. Pictures    4. Payment    5. Review &
               & Description  & Details    & Shipping   Submit Item Title:  Porsche :Boxster
Item Subtitle:  2000 Silver New Condition

Item Specifics

2000 Porsche Boxster Roadster 2-door

Vehicle Identification    WPOCA298XYU626870
Number (VIN)

Mileage *          12000 miles
Exterior Color *   Silver
Interior Color *   Black Learn more about how
Item Specifics can help
you sell your item Standard Equipment *

- ✓ 2 Wheel drive          ✓ 5 Speed
- ✓ Rear Spoiler           ✓ Power Seat Driver
- ✓ Auto Climate Control   ✓ Cassette
- ✓ Automatic transmission ✓ Driver Airbag
- ✓ Side air bag           ✓ AM/FM Radio
- ✓ Passenger Airbag       ✓ Cassette
- ✓ Leather seats          ✓ Convertible
- ✓ Anti Lock Brakes       ✓ Power Windows
- ✓ Power Door Locks How do I find out what
options my car has?

Optional Equipment *

- ☐ After Mkt Options      ☐ Heated Seats
- ☐ CD                     ☐ Integrated Phone
- ☐ CD Changer             ☐ Power Door Locks
- ☐ Cruise Control         ☐ Premium Sound
- ☐ Custom Paint           ☑ Telescoping Wheel
- ☐ Full Leather           ☐ Tonneau
- ☐ Hard Top               ☐ Traction Control
- ☐ Hard Top               ☐ Traction Control

Fig. 16A

| | |
|---|---|
| Wheels * | Alloy Wheels (Standard) |
| Air conditioning * | Auto Climate Control |
| Package * | None |
| Drivetrain * | 2 Wheel Drive (Standard) |
| Transmission * | 5 Speed (Standard) |
| Spoiler * | Rear Spoiler (Standard) |
| Power Seat * | Power Seat Driver (Standard) |
| Is there an Existing Warranty? * | Vehicle does NOT have an existing warranty. |
| Type of Vehicle This * | Clear (most titles) |
| Vehicle Inspection * | None or Other inspection service |

Vehicle Condition

| | |
|---|---|
| Maintanance History Available | See Description |
| Interior Condition | See Description |
| Exterior Condition | See Description |
| Rust? | See Description |
| | If you answer yes, please provide details in the item description. |

Vehicle Description
Add to your description in the box below, then click "Save Changes."
Remember: You can only add to, not change your current description.
View your current description

Add To Description *

[Font Name ▽]  [Font Size ▽]  [Color ▽]

[B] [I] [U] [≡] [≡] [≡] | 1— 2— 3—    □ View as HTML

Preview your revised description

[Cancel Changes]   [Save Changes]

Home    Browse    Sell    Enthusiasts    Search    Services    Help

Fig. 16B

METHOD AND SYSTEM TO GENERATE A LISTING IN A NETWORK-BASED COMMERCE SYSTEM

CROSS REFERENCE TO RELATED APPLICATION

This application is a continuation of U.S. patent application Ser. No. 10/648,125, filed Aug. 25, 2003, which claims the benefit of U.S. Provisional Patent Application Ser. No. 60/437,199, filed Dec. 31, 2002, the benefit of priority of each of which is claimed hereby, and each are incorporated herein by reference in their entirety.

FIELD OF THE INVENTION

The present invention relates generally to the field of electronic commerce, and more specifically to a method and system to generate a listing in a network-based commerce system.

BACKGROUND

More and more Internet users are realizing the ease and convenience of buying and selling online via a network-based commerce system. Certain such commerce systems are focused on person-to-person trading, and collectors, hobbyists, small dealers, unique listing seekers, bargain hunters, and other consumers, are able to buy and sell millions of listings at various online shopping sites. Such systems also support business-to-person and business-to-business commerce.

The success of a networked-based commerce system may depend upon its ability to provide a user-friendly environment in which buyers and sellers can conduct business efficiently. Current network-based commerce systems have certain limitations in the manner in which a user can post a listing on such systems.

SUMMARY OF THE INVENTION

According to one aspect of the invention, there is provided a method and system of generating a listing in a network-based commerce system. The method includes receiving listing identification data from a user, and retrieving listing data associated with the listing based on the listing identification data. Thereafter, a listing is generated that is at least partially based on the listing data and posted on the network-based commerce system. In one embodiment, the user may edit the listing data prior to posting the listing. The network-based commerce system may include a database of listing data associated with at least one of movies, music, games, books and motor vehicles. In one embodiment, a plurality of check boxes is provided each of which are associated with an attribute of the listing and the method automatically, without human intervention, checks attributes based on the listing data.

Other features of the present invention will be apparent from the accompanying drawings and from the detailed description that follows.

BRIEF DESCRIPTION OF THE DRAWINGS

The invention is now described, by way of example, with reference to the accompanying diagrammatic drawings in which like reference numerals are used to indicate the same or similar features, unless otherwise indicated.

FIG. 3 shows an exemplary listings table of the database of FIG. 2.

FIG. 8 shows an exemplary user interface generated by the method of FIG. 6.

FIG. 9 shows an exemplary user interface for selecting one of a plurality of listings corresponding with a VIN.

FIG. 10 shows an exemplary user interface including a plurality of check boxes for generating the listing.

FIG. 11 shows an exemplary user interface wherein a title for the listing is generated in an automated fashion from the VIN.

FIG. 12 shows portion of an exemplary user interface for previewing the listing prior to posting it on the network-based commerce system.

FIGS. 13A and 13B show an exemplary user interface of a proposed listing presented to a user.

FIGS. 14 to 16B show exemplary user interfaces for editing a posted listing after bids for the listing have been posted.

DETAILED DESCRIPTION

A method and system automatically to generate listings in a network-based commerce system based on reference listing data is described. In the following description, for purposes of explanation, numerous specific details are set forth in order to provide a thorough understanding of the invention. It will be evident, however, to one skilled in the art that the invention may be practiced without these specific details.

For the purposes of the present specification, the term "listing" or "item" may refer to any description, identifier, representation or information pertaining to a listing, service, offering or request that is stored within a network-based commerce system. As such, a listing may be an auction or fixed-price offering (e.g., products such as goods and/or services), an advertisement, or a request for a listing or service.

Transaction Facility

Figure 1:
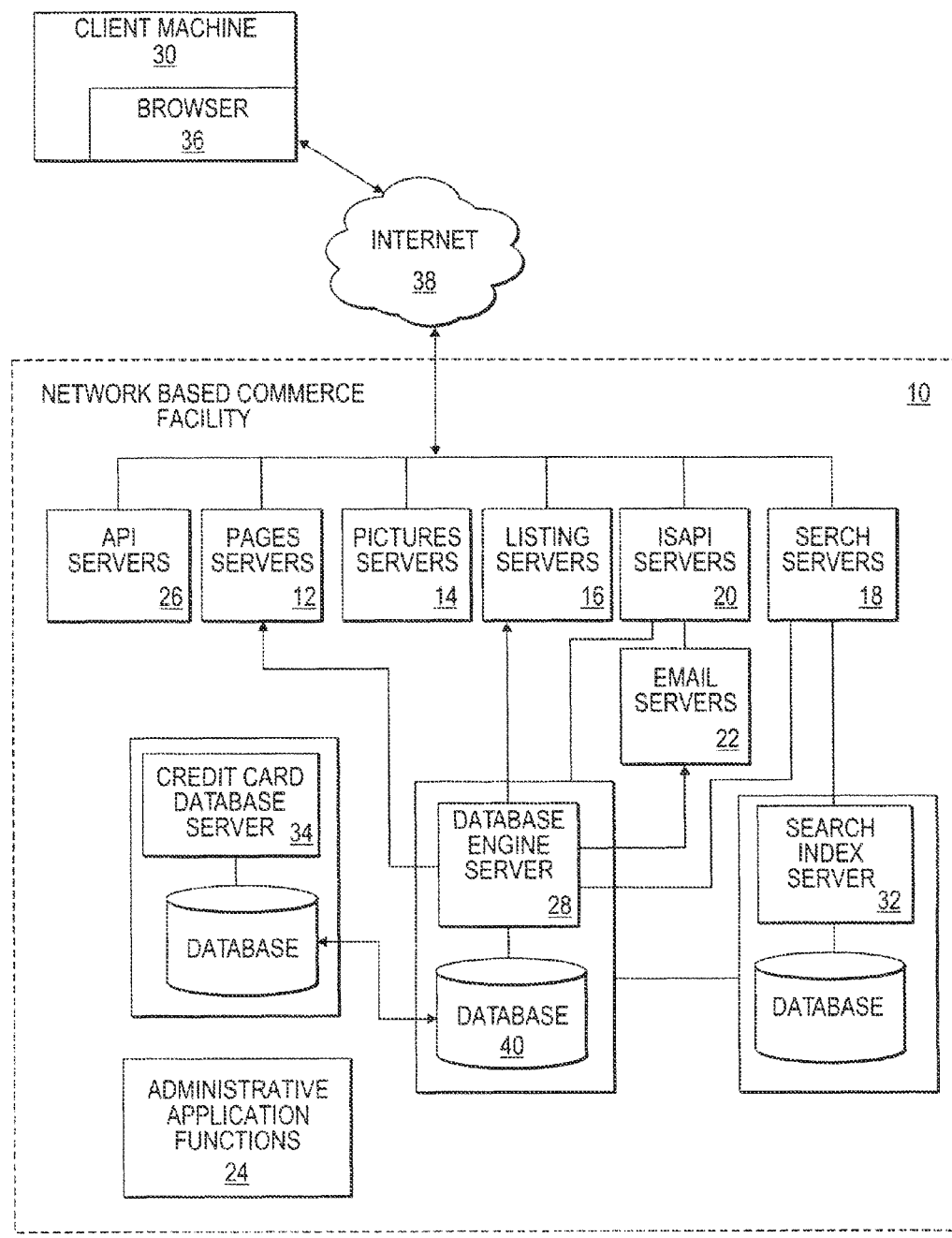
FIG. 1 shows a schematic block diagram of an exemplary network-based commerce system, in accordance with the invention.

FIG. 1 is block diagram illustrating an exemplary network-based commerce system 10. While an exemplary embodiment of the present invention is described within the context of the network-based commerce system 10, the invention will find application in many different types of computer-based, and network-based, facilities (commerce, transaction or otherwise).

The network-based commerce system 10 includes one or more of a number of types of front-end servers that each includes at least one Dynamic Link Library (DLL) to provide selected functionality. The system 10 includes page servers 12 that deliver web pages (e.g., mark-up language documents), picture servers 14 that dynamically deliver images to be displayed within Web pages, listing servers 16 that facilitate category-based browsing of listings, search servers 18 that handle search requests to the system 10 and facilitate keyword-based browsing of listings, and ISAPI servers 20 that provide an intelligent interface to a back-end of the system 10. The system 10 also includes e-mail servers 22 that provide, inter alia, automated e-mail communications to users of the network-based commerce system 10. In one embodiment, one or more administrative application functions 24 facilitate monitoring, maintaining, and managing the system 10. One or more API servers 26 may provide a set of API functions for querying and writing to the network-based commerce system 10. APIs may be called through the HTTP transport protocol. In one embodiment, information is sent and received using a standard XML data format. Applications utilized to interact (e.g., upload transaction listings, review transaction listings, manage transaction listings, etc.) with the network-based commerce system 10 may be designed to use the APIs. Such applications may be in an HTML form or be a CGI program written in C++, Perl, Pascal, or any other programming language.

The page seers 12, API servers 26, picture servers 14, ISAPI servers 20, search servers 18, e-mail servers 22 and a database engine server 28 may individually, or in combination, act as a communication engine to facilitate communications between, for example, a client machine 30 and the network-based commerce system 10; act as a transaction engine to facilitate transactions between, for example, the client machine 30 and the network-based commerce system 10; and act as a display engine to facilitate the display of listings on, for example, the client machine 30.

The back-end servers may include the database engine server 28, a search index server 32 and a credit card database server 34, each of which maintains and facilitates access to a respective database.

In one embodiment, the network-based commerce system 10 is accessed by a client program, such as for example a browser 36 (e.g., the Internet Explorer distributed by Microsoft Corp. of Redmond, Wash.) that executes on the client machine 30 and accesses the network-based commerce system 10 via a network such as, for example, the Internet 38. Other examples of networks that a client may utilize to access the network-based commerce system 10 include a wide area network (WAN), a local area network (LAN), a wireless network (e.g., a cellular network), the Public Switched Telephone Network (PSTN) network, or the like. The client program that executes on the client machine 30 may also communicate with the network-based commerce system 10 via the API servers 26.

Database Structure

Figure 2:
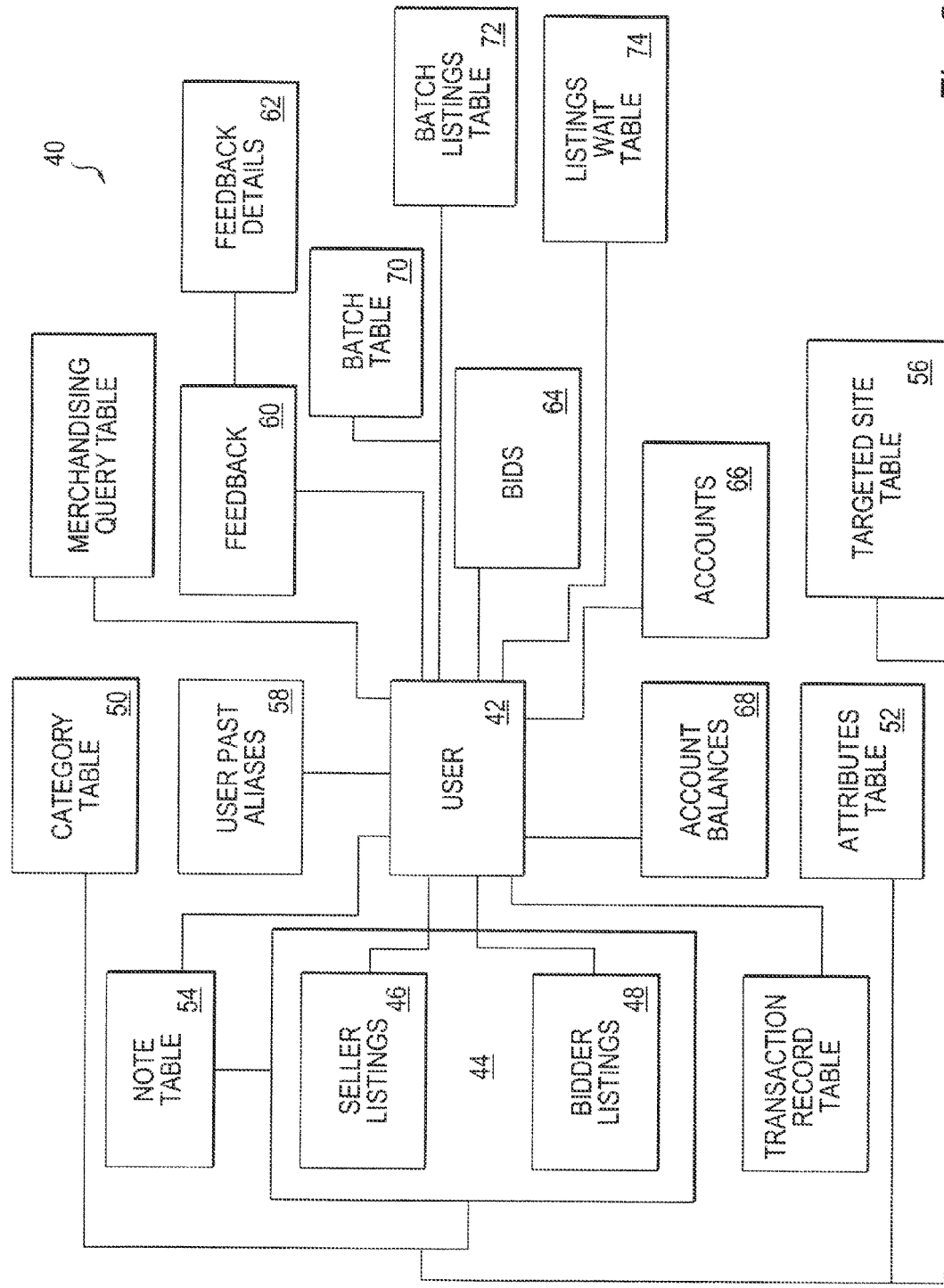
FIG. 2 shows exemplary tables of a database of the system of FIG. 1.

FIG. 2 is a database diagram illustrating an exemplary database 40, maintained by and accessed via the database engine server 28, which at least partially implements and supports the network-based commerce system 10. In one embodiment, the database engine server 28 may maintain two databases, a first database being maintained for listing (or offering) information that is not included within a virtual "store", and a second database for listing (or offering) information that is presented via a virtual "store" supported by the network-based commerce system 10.

The database 40 may, in one embodiment, be implemented as a relational database, and includes a number of tables having entries, or records, that are linked by indices and keys. In an alternative embodiment, the database 40 may be implemented as collection of objects in an object-oriented database.

The database 40 (see FIG. 2) includes a user table 42 that contains a record for each user of the network-based commerce system 10. A user may operate as a seller, a buyer, or both, when utilizing the network-based commerce system 10. The database 40 also includes listings tables 44 that may be linked to the user table 42. The listings tables 44 may include a seller listings table 46 and a bidder listings table 48. A user record in the user table 42 may be linked to multiple listings that are being, or have been, listed or offered for sale via the network-based commerce system 10. In one embodiment, a link indicates whether the user is a seller or a bidder (or buyer) with respect to listings for which records exist within the listings tables 44. An exemplary listings table is also shown in FIG. 3.

The database 40 also includes one or more divisions in the form of categories provided in category tables 50. Each record within the category table 50 may describe a respective category. In one embodiment, listings provided by the system 10 are arranged in the categories. These categories may be navigable by a user of the network-based commerce system 10 to locate listings in specific categories. Thus, categories provide a mechanism to locate listings that may be browsed. In addition or instead, an alphanumeric search mechanism may be provided by the search servers 20 to allow a user to search for specific listings using search terms or phrases. In one embodiment, the category table 50 describes multiple, hierarchical category data structures, and includes multiple category records, each of which describes the context of a particular category within the multiple hierarchical category structures. For example, the category table 50 may describe a number of real, or actual, categories to which listing records, within the listings tables 44, may be linked.

The database 40 also includes one or more attributes tables 52. Each record within the attributes table 52 describes a respective attribute associated with a listing. In one embodiment, the attributes table 52 describes multiple, hierarchical attribute data structures, and includes multiple attribute records, each of which describes the context of a particular attribute within the multiple hierarchical attribute structures. For example, the attributes table 52 may describe a number of real, or actual, attributes to which listing records, within the listings tables 44, may be linked. Also, the attributes table 52 may describe a number of real, or actual, attributes to which categories, within the category table 50, may be linked.

The database 40 may also include a note table 54 populated with note records that may be linked to one or more listing records within the listings tables 44 and/or to one or more user records within the user table 42. Each note record within the note table 54 may include, inter alia, a comment, description, history or other information pertaining to a listing being offered via the network-based commerce system 10, to a user of the network-based commerce system 10. The database 40 may also include a targeted site table 56 populated with targeted site records that may be linked to one or more listing records within the listings tables 44 and/or to one or more user records within the user table 42.

A number of other exemplary tables may also be linked to the user table 42, namely a user past aliases table 58, a feedback table 60, a feedback details table 62, a bids table 64, an accounts table 66, and an account balances table 68. In one embodiment, the database 40 also includes a batch table 70, a batch listings table 72, and a listings wait table 74.

It will be appreciated that the success of a seller in, for example, selling a listing may be dependent upon the listing information provided when the listing is posted to the network-based commerce system.

Generating a Listing

Figure 4:
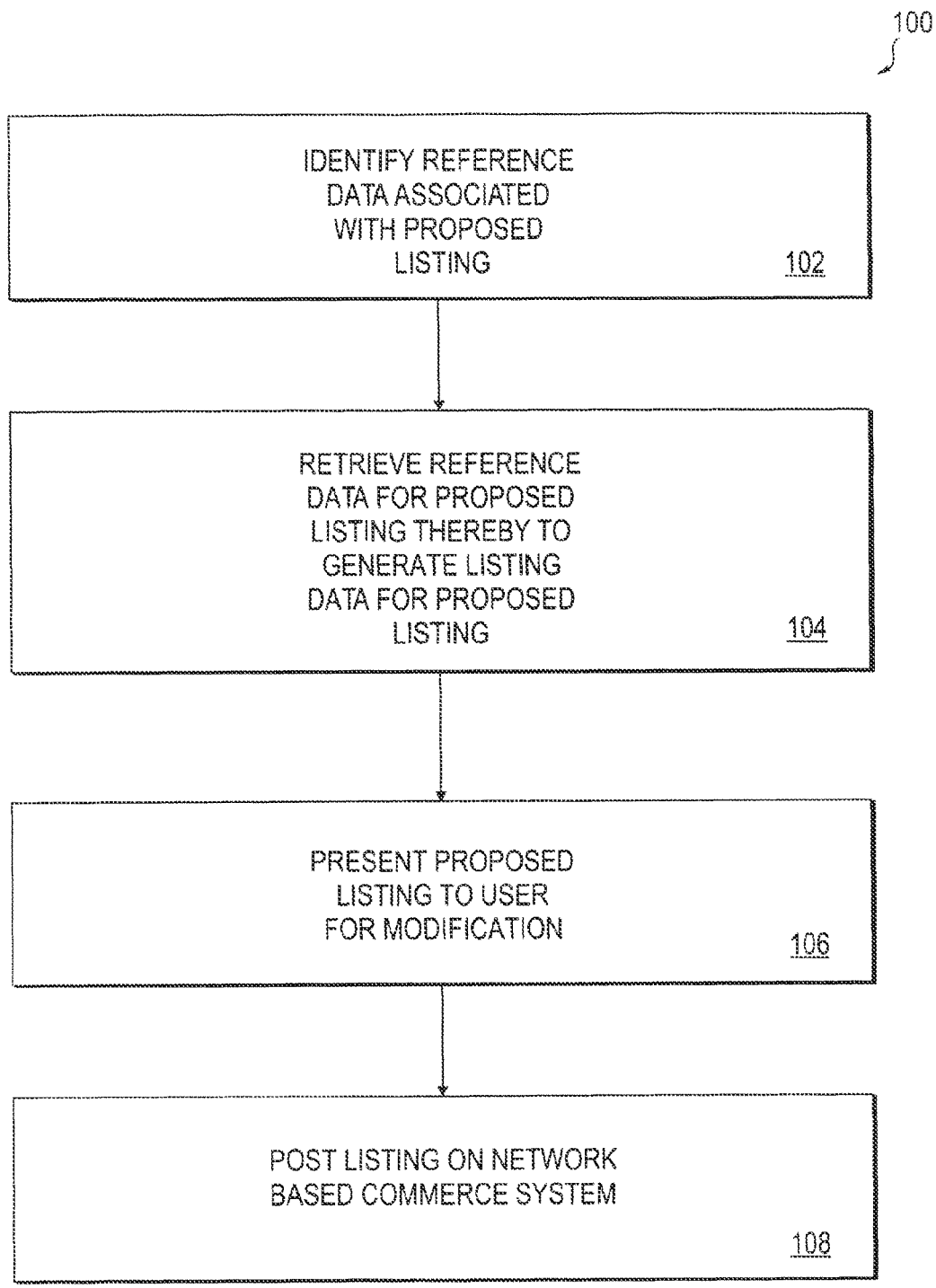
FIG. 4 shows a schematic flow diagram of a method, in accordance with the invention, to generate a listing in a network-based commerce system.

Referring in particular to FIG. 4, reference numeral 100 generally indicates a method, in accordance with the invention, of generating a listing in the exemplary network-based commerce system 10. In one embodiment, the method 100 automatically populates fields (e.g., includes listing information) of a listing submitted to the network-based commerce system 10 by a user. Although the method 100 may be used to post listings for any type of listing (e.g., products including goods and/or services, advertisements, and so on) its application in posting listings for the sale of motor vehicles in an auction based commerce system is described herein by way of example.

As shown at Block 102, the method 100, broadly, identifies reference data associated with the proposed listing and, thereafter, retrieves the reference listing data for the proposed listing from a reference data store and then, in an automated fashion, generates listing data for the proposed listing (see block 104) based on the reference listing data. As will be described in more detail below, the method 100 then presents the proposed listing to the user and allows the user to modify (e.g., edit) the data or information in the proposed listing (see block 106). In one embodiment, the method 100 pre-populates fields of a web page with appropriate data that has been retrieved and then allows the user to modify the data as required. Once the proposed listing has been finalized (and/or accepted) by the user, it may then be posted on the network-based commerce system 10 as shown at block 108.

When the method 100 is applied to listings in the form of motor vehicles (including motorcycles and the like) an identifier such as a Vehicle Identification Number (VIN) may be used to identify the appropriate reference data or information associated with the listing (see block 102). Thus, key data associated with the particular (e.g., the vehicle) is provided to the user wishing to list the vehicle in an automated fashion. Accordingly, in one embodiment, a user posting a listing is not confronted with the dilemma as to what information to enter when listing (e.g., setting a car) via the network-based commerce system 10. In one embodiment, the method 100 generates a template suitable for selling a motorcar and the template is then populated with the appropriate reference data identified using the VIN. Further, as reference listing data is retrieved from a reference data source (e.g., a catalogue of VIN data), the integrity of the data provided in the listing is thereby enhanced as the reference data source may be checked and user error is thereby reduced. In certain embodiments, the catalogue of reference listing data is sourced from an appropriate data provider to enhance its accuracy. Accordingly, the data used to populate the template may thus be sourced from an external system. The VIN catalogue data provider may include VIN data substantially similar to that used by dealers, manufacturers, distributors or the like to list vehicles for sale in a wholesale market.

Figure 5:
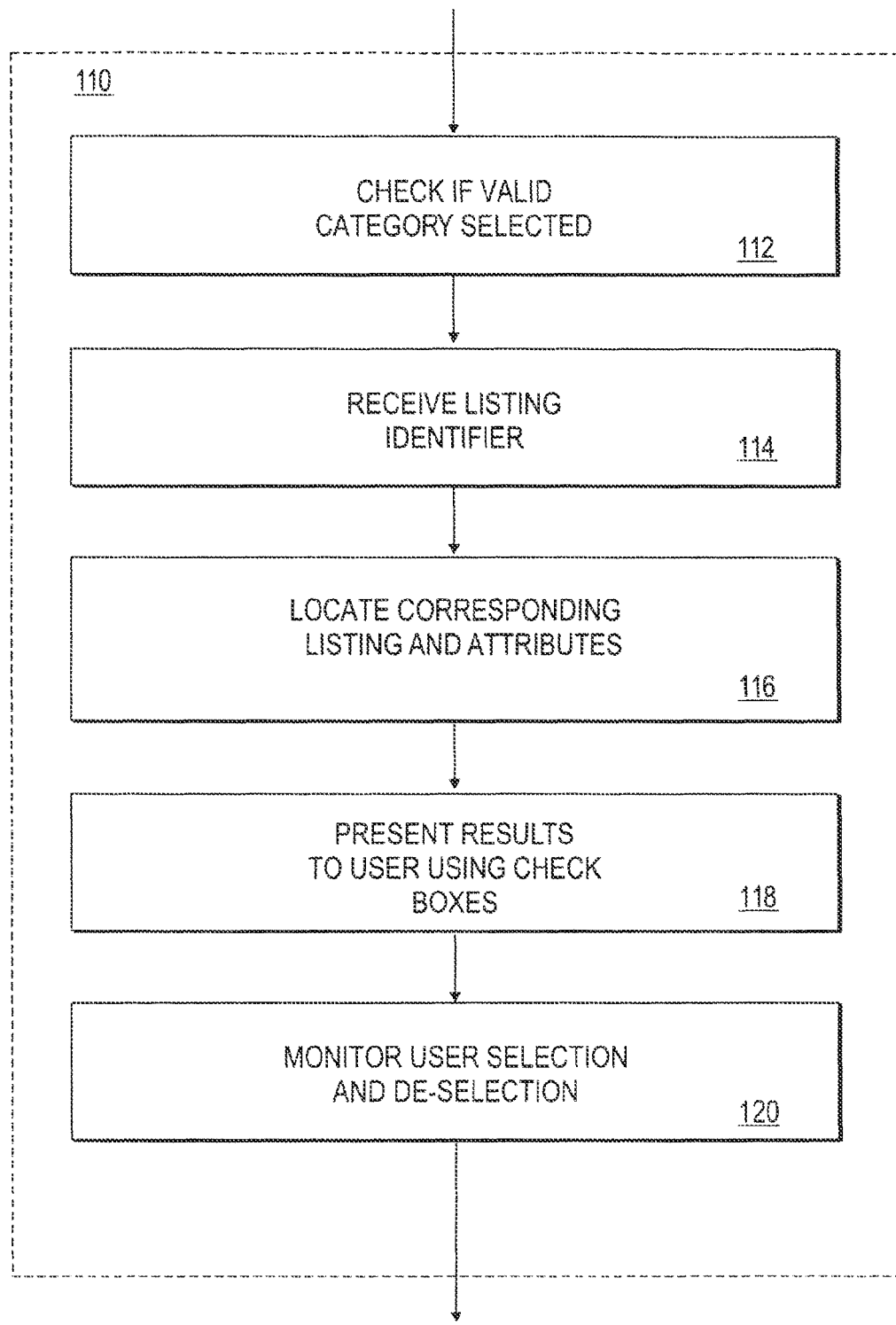
FIG. 5 shows a schematic flow diagram of a further method, in accordance with the invention, to generate a listing.

Reference numeral 110 (see FIG. 5) generally indicates a method, in accordance with the invention, for generating a listing for a motor vehicle using a VIN. In the exemplary network-based commerce system 10, a user may list any item in any one or more of a plurality of categories. However, not all categories may be provided with the automated listing generation functionality. As will be described in more detail below, exemplary categories, in addition to motor vehicles, may include movies, music, and books.

Returning to FIG. 5, as shown at block 112, a check is first conducted to determine if the user selects a valid category which allows automated generation of a proposed listing such as a motor vehicle listing in a motor vehicle category. If a category is selected by the user that does not support automated generation of the proposed listing, then an appropriate message may be communicated to the user. However, a supported category is selected (in our present example the motor vehicle category) then, as shown at block 114, the method 110 then receives a listing identifier in the form of a VIN from the user. In certain embodiments, a check may then be conducted to determine whether or not a valid VIN has been entered. Thereafter, the corresponding listing and attribute data (e.g., any data describing the listing) is located (see block 116) and inserted into a predefined template that provides fields for appropriate data. In particular, the template receives the listing and attribute data from the exemplary VIN catalogue and presents the results to a user via a graphic user interface such as a web page (see block 118) including a plurality of check boxes, as described in more detail below. Each check box may correspond to an attribute that the listing may or may not have. Thereafter, the method 110 monitors user selection and de-selection (see block 120) of the check boxes so as to remove attributes that have been retrieved from the VIN catalogue and populated into the template, and/or add attributes not identified using the VIN catalogue sourced, for example, from a VIN Catalogue data provider.

As mentioned above, in one embodiment the attributes (e.g., sound system, leather seats, custom paint, heated seats, hard top, etc.) of the listing are identified in the template using a plurality of check boxes. Accordingly, in this embodiment, the check boxes may be automatically checked based on the VIN using the VIN catalogue. However, as mentioned above, any listing identifier may be used to retrieve any attributes or information relating to a proposed listing. It will be appreciated that different templates may be populated dependent upon the nature of the listing and the category in which it is to be listed.

Figure 6:
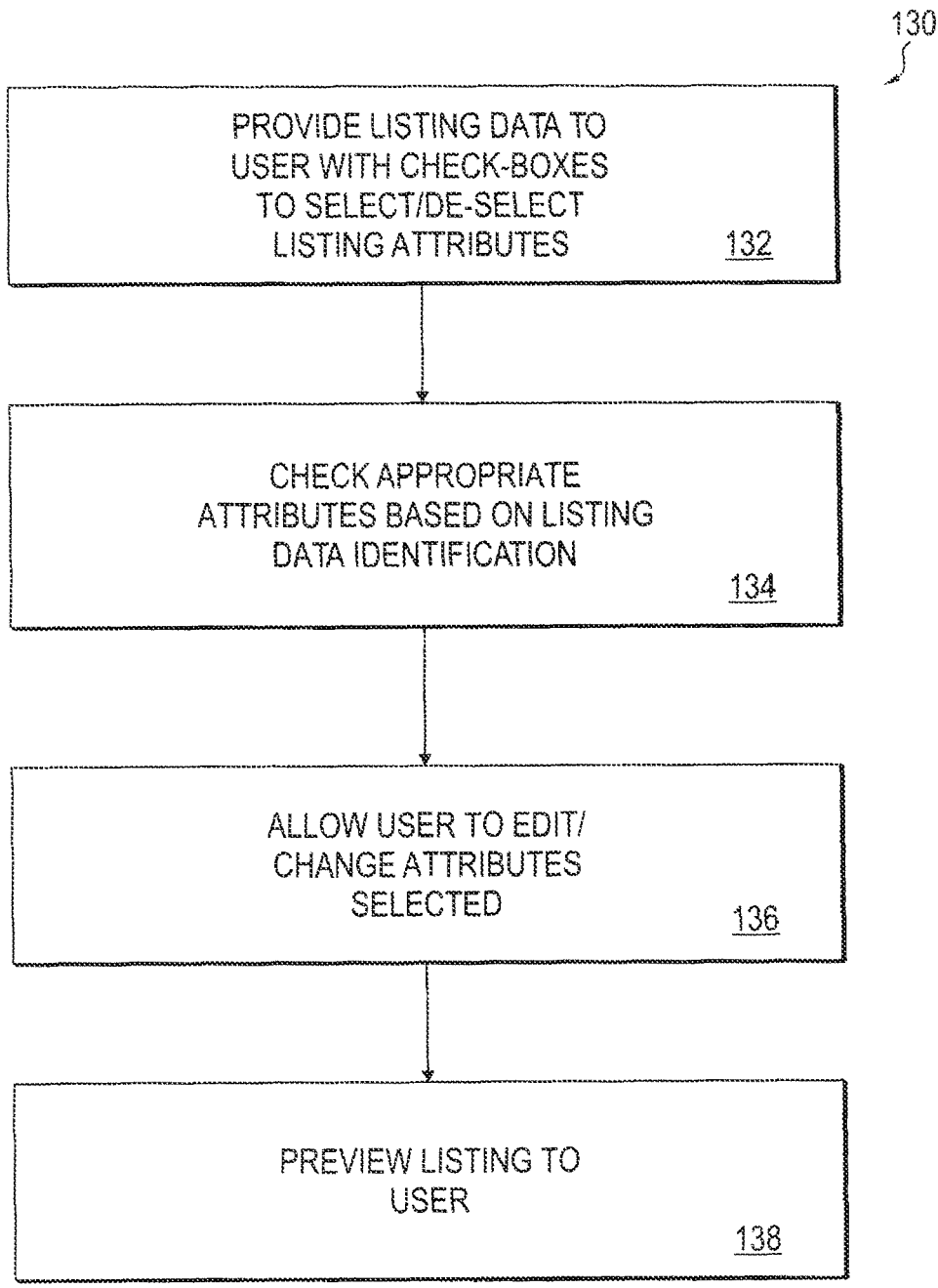
FIG. 6 shows a schematic flow diagram of a method, in accordance with the invention, to generate a listing using a Vehicle Identification Number (VIN) and vehicle attributes.

Reference numeral 130 (see FIG. 6) generally indicates a further method, in accordance with the invention, for generating a listing in a network-based commerce system 10 using a plurality of check boxes which are pre-checked based on an identifier entered by the user and listing data or information stored in a database. At block 132, the method 130 provides a proposed listing to the user with check boxes that identify various attributes associated with the listing. Thereafter, as shown at block 134, the check boxes are automatically checked based on appropriate attributes retrieved from a reference listing database based on listing identification data. The identification data may be a title of a movie, compact disc, UPC code or any other identifier that can be used to identify data associated with the listing. Thereafter, as shown at block 136, after a proposed listing has been presented to the user, the user may then select or de-select any one or more of the check boxes, thereby to modify the proposed listing that has been generated in an automated fashion based on the identification data. Once the user has modified the check boxes as required, then a preview of the proposed listing is presented to the user at block 138 prior to the listing being posted on the network-based commerce system 10.

Figure 7:
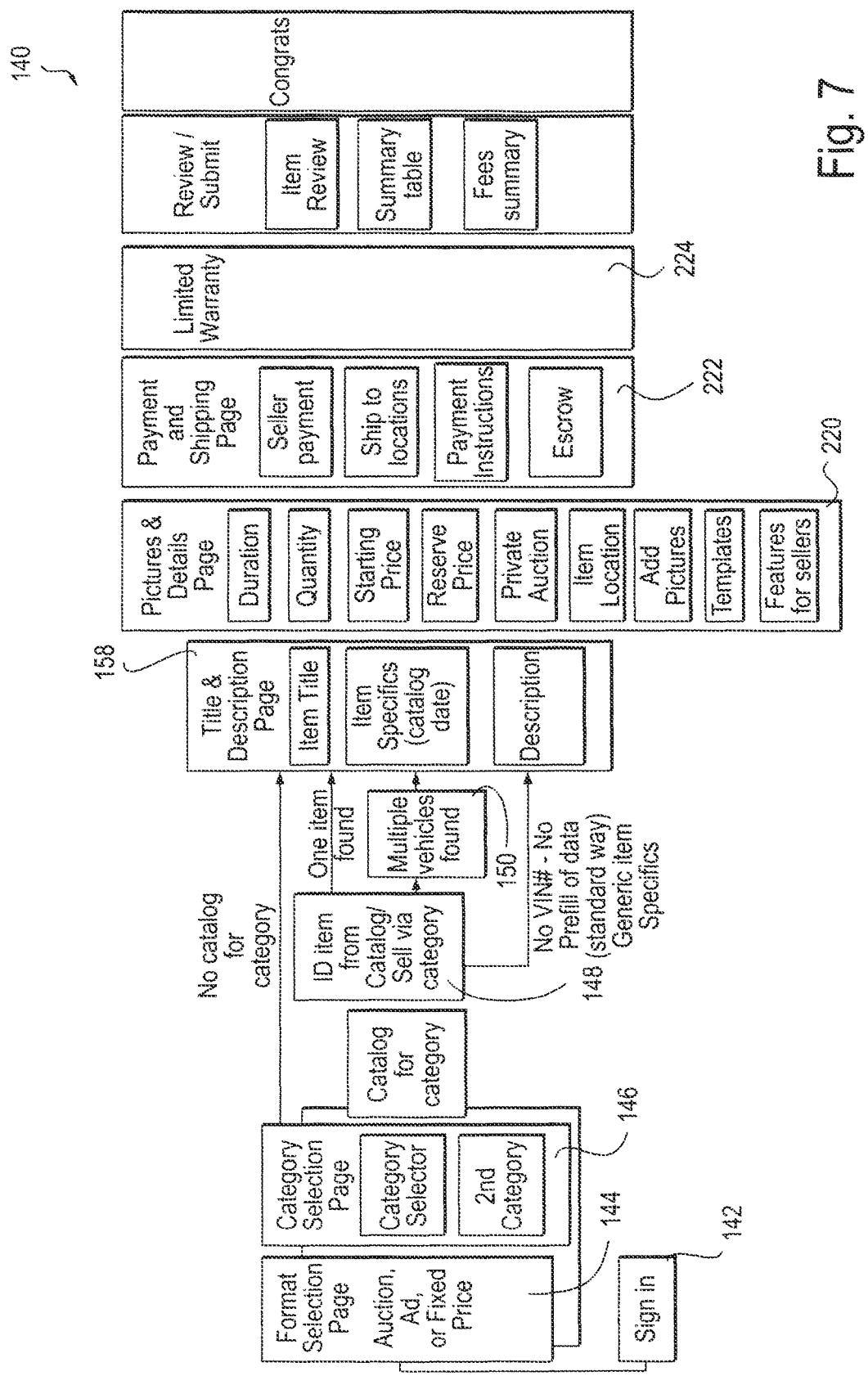
FIG. 7 shows a schematic functional diagram of a method, in accordance with the invention, to post listings in a network-based commerce system.

Referring in particular to FIG. 7, reference numeral 140 generally indicates a method, in accordance to the invention, for a user to post a listing on the network-based commerce system 10 using, for example, the methods 100, 110, and 130. As shown at block 142, the user is first requested to sign in at the network-based commerce system 10 and, thereafter choose the particular format that the user wishes to use for the listing. In one embodiment, the user is provided with an option to select an auction format, an advertisement format, or a fixed price format. Thereafter, as shown at block 146, the user may then select an appropriate category (see block 112 in FIG. 5). In one embodiment, a user is provided with the option to select both a first or main category as well as a second category for the listing.

At block 148, the method provides the user with an option to select a standard or conventional listing procedure, or list using the method 100, in accordance to the invention. If the user selects to list using a conventional procedure, the user is then required to populate all fields for the listing manually without automated assistance. However, if the user selects to generate a new listing in an automated fashion using the method 100, then the user at block 148 enters identification data (e.g., the VIN of a vehicle which he or she wishes to list). In one embodiment, a user interface the form of an exemplary web page 150 (see FIG. 8) is presented to the user.

In certain embodiments when the user selects to list a motor vehicle, the network-based commerce system 10 may request a user to identify whether the listing is newer than a predetermined year (e.g., 1990) or older than a predetermined year (e.g., 1989), for example, to accommodate a VIN catalogue that does not include older listings. Further, the web page 150 provides a data entry field 152 for the user to enter the VIN of the vehicle that he or she is wishing to list. In one embodiment, the method 140 checks the validity of the VIN entered by the user.

Thereafter, the method 140 monitors activation or clicking of a "Continue" button 154 in order to proceed with the automated listing functionality. If, however, the user chooses to list a vehicle that is older than the predetermined date (e.g., 1989 or older), no VIN is entered and the user may then immediately activate a "Continue" button 156.

Once the network-based commerce system 10 has received the VIN, and in the event of only a single listing or motor vehicle being found that corresponds to the entered VIN, then the method 140 proceeds directly to a Title and Description operation or block 158. Likewise, if the user enters no VIN and the "Continue" button 156 is activated, then the method 140 also proceeds directly to the Title and Description block 158. If, however, the network-based commerce system 10 locates multiple vehicles associated with the VIN, the method 140 generates a user interface in the form of a web page 160 (see FIG. 9) that identifies all the vehicles found in the VIN catalogue associated with the VIN. Each listing located may include an associated "Sell one like this" button 162 and, using the buttons 162, the user may then select a corresponding listing that is most appropriate to his or her proposed listing.

Returning to FIG. 7, the method 140 then automatically generates a title and description page based on attributes or information retrieved from the VIN catalogue and presents a user interface in the form of a web page 164 (see FIG. 10) including a plurality of check boxes. The check boxes may, for example, be associated with attributes of the particular listing. For example, as generally indicated by reference numeral 166, the web page may be generated by a template including a heading "Standard Equipment" that shows a plurality of different attributes or characteristics associated with the listing. For example, when the listing is a motor vehicle, the attributes may include "2 Wheel Drive", "5 Speed", "Rear Spoiler", "Power Seat Driver", "Auto Climate Control", "Cassette", and so on. Each attribute has an associated check box 168 (only a few of which are referenced in FIG. 10 of the drawings). In the exemplary web page 164, all the check boxes 168 under Standard Equipment have all been checked by way of example based on the VIN that the user entered into the data entry field 152 (see FIG. 8). However, it is to be appreciated that in other circumstances, none of the check boxes 168 or any number of the check boxes 168 may be checked based on the information in the VIN catalogue. The web page 164 also includes an "Optional Equipment" section 170 in which check boxes are provided for optional equipment. For example, a check box may be provided for "After Market Options", "Heated Seats", "CD", "Integrated Phone", "CD Changer", "Power Door Locks", and so on. The check boxes may be checked based on the information included in the VIN catalogue. In one embodiment, the web page 164 includes a data entry field 172 wherein a user may enter the mileage on the vehicle, a drop down menu 174 to enable the user to choose an exterior color, and a drop down menu 176 for choosing an interior color of the vehicle, and so on. Likewise, drop down menus 178 to 190 may be provided for specifying type of wheels, air-conditioning, package, drive train, transmission, spoiler, and power seat respectively.

In one embodiment, the method 100 automatically generates a title for the listing based on the VIN. In particular, the VIN is used to determine a year, make and model, sub-model/style/trims specified, number of doors, and engine capacity (cylinders and output). Thus, as shown by a user interface in the form of a web page 192 (See FIG. 11), a title 194 for the listing may be generated in an automated fashion using information in the VIN catalogue that has been identified by the VIN. For example, in the web page 192, the title "1999 Porsche Boxster S 2-door 6 CYLINDER 2.7 LITER" may be generated in an automated fashion using the VIN 196. Thus, broadly, information or data in a reference database (e.g., the VIN catalogue) may be used (e.g., concatenated) to generate, for example, a title, a description, or the like. In the present example of listing a motor vehicle, based on the VIN catalogue information, an exemplary listing preview 198 (see FIG. 12.) may be generated. When the network-based commerce system 10 is an Internet-based system, the listing preview 198 may be in the form of a web page and may include both user entered information as well as information or data that has been populated in an automated fashion using the VIN.

Figure 13A:
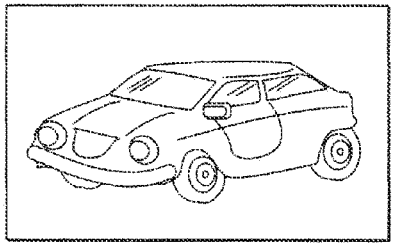

A vehicle description 200 (see FIG. 12) may also be retrieved from the VIN catalogue and populated in the listing preview 198. In one embodiment, the method 140 allows a user to edit the proposed listing prior to posting it on the network-based commerce facility 10. The listing may be edited, for example, using a rich text editor (e.g., a JavaScript text editing tool that allows each description field to have text editing and a dynamic display). An exemplary user interface 204 (see FIG. 13) provides the user with an opportunity to review and submit a listing posted on the network-based commerce system 10.

In certain embodiments of the invention, a user may edit or modify a listing or item after it has been posted on the network-based commerce system 10. For example, in one embodiment of the invention, the system 10 includes a "Revise Your Item" (RYI) function. For example, when the network-based commerce system 10 is a network-based auction system, if there are no bids and more than 12 hours remaining in the auction for the listing, the user or seller may be able to make selected changes. However, when there is either a bid or less than 12 hours remaining, the user or seller may be able to supplement the listings' previous description. If, for example, both a bid and less than 12 hours remain, the seller may in this case make changes not affecting the core description of the listing. Exemplary user interfaces for revising the listing in the form of exemplary web pages are provided in FIGS. 14 to 18.

The web page 210 (see FIG. 14) allows a user to edit pictures or images and listing or item details. The web page 2110 allows features such as highlighting, featured category selection, a motors gallery feature, listing icons, page counters, or the like to be added and/or removed. In a similar fashion, a web page 212 is generated to allow the user to add and/or edit a description of the listing or item, and a web page 214 (see FIG. 16) is provided to edit or change check boxes that describe the attributes or features of the listing. In a similar fashion, user interfaces in the form of web pages may be provided that allow the user to revise an item if no bids have been entered or posted for the listing.

Returning to FIG. 7, the method 140 allows a user to add pictures or images at operation or block 220, select shipping and payment methods at operation or block 222, establish warranty details at block 224, and so on.

As mentioned above, the methods 100, 110, 130 and 140 can be applied to any listing in any network-based commerce system. Further, the identification data that the user enters may differ from one listing to another. For example, when a listing is automatically generated for listing in an exemplary movies category, the listing identification data may be a title of the movie or its UPC code. In one embodiment, a help facility to assist a user in finding the UPC code of the movie may be provided. Further, for example when listing a music CD, the user may enter an artist name, title of the CD and so on. Thus, broadly, the invention allows assisted listing wherein an appropriate template is populated with relevant data pertaining to a proposed listing. In one embodiment, the template includes a plurality of check boxes that are checked in an automated fashion based on reference listing data. It is to be appreciated that the listing generated may include extensive information on the listing or any varying degree of information.

Figure 17:
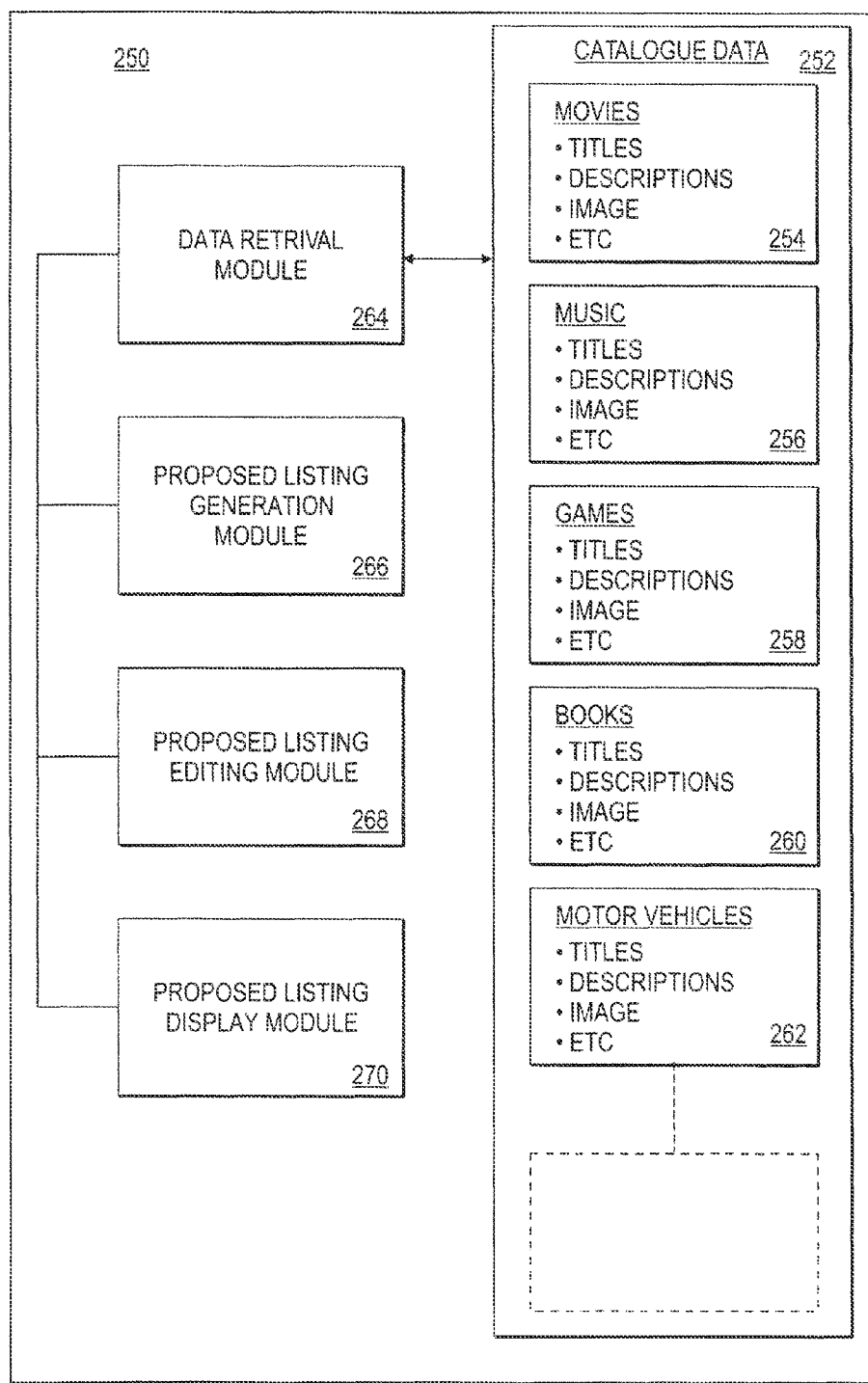
FIG. 17 shows a schematic block diagram of a further system, in accordance with the invention, to generate a listing in a network-based commerce system.

Referring in particular to FIG. 17 of the drawings, reference numeral 250 generally indicates a network-based commerce system in accordance with the invention. The system 250 includes database 252 that includes reference listing data associated with a plurality of listings. In one embodiment, the database 252 is a distributed database, however, in other embodiments it may be a central database. The database 252 is shown to include catalogue data including reference data on movies 254, music 256, games 258, books 260, motor vehicles 262 and so on.

The system 250 includes a data retrieval module 264, a proposed listing generation module 266, a proposed listing editing module 268, and a proposed listing display module 270. The modules 264 to 270 either individually, or in combination execute the functionality of the above described methods 100, 110, 130 and 140.

Figure 18:
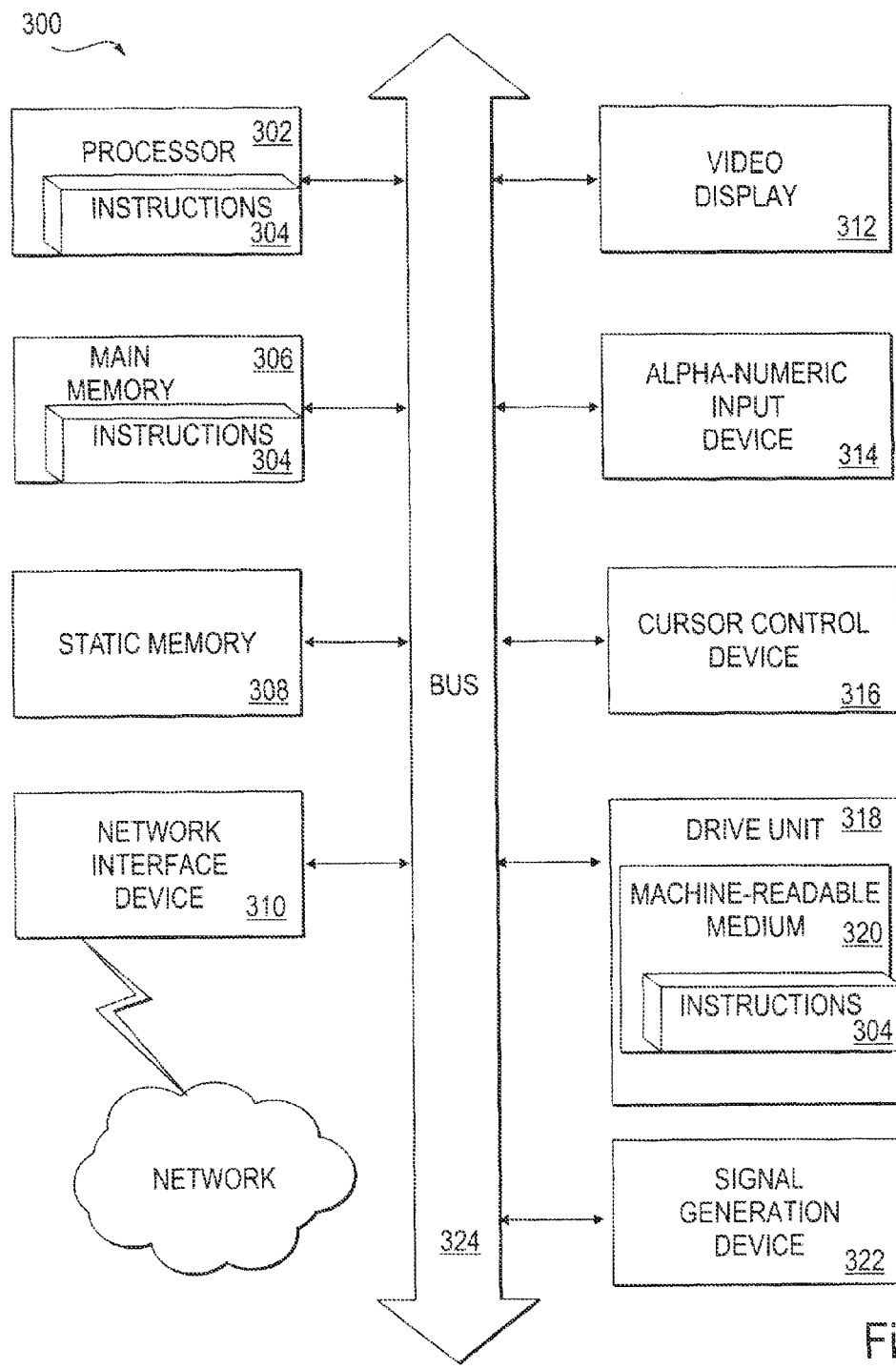
FIG. 18 shows an exemplary computer system for executing a set of instructions to carry out any one or more of the methods described herein.

FIG. 18 shows a diagrammatic representation of a machine in the exemplary form of a computer system 300 within which a set or sequence of instructions, for causing the machine to perform any one of the methodologies discussed herein, may be executed. In alternative embodiments, the machine may comprise a network router, a network switch, a network bridge, Personal Digital Assistant (PDA), a cellular telephone, a web appliance, set-top box (STB) or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g., a keyboard), a cursor control device 314 (e.g., a mouse), a disk drive unit 316, a signal generation device 318 (e.g., a speaker) and a network interface device 320 to interface the computer system to a network 122.

Figure 15:
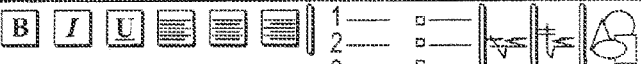

The disk drive unit 316 includes a machine-readable medium 324 on which is stored a set of instructions or software 326 embodying any one, or all, of the methodologies described herein. The software 326 is also shown to reside, completely or at least partially, within the main memory 304 and/or within the processor 302. The software 326 may further be transmitted or received via the network interface device 320. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Further, while the software is shown in FIG. 15 to reside within a single device, it will be appreciated that the software 326 could be distributed across multiple machines or storage media, which may include the machine-readable medium.

Thus, a method and system to generate a listing in a network-based commerce system 10 have been described. Although the invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of listing a product for sale, comprising:

receiving by a server, via a client machine, from a seller who desires to sell the product, a selection of an option to generate a proposed listing in an automated fashion, the automated fashion comprising adding attributes to the proposed listing without human intervention;

responsive to receiving the selection of the option to generate a proposed listing in automated fashion, presenting a user interface at the client machine for the seller to provide, via the client machine, listing information data that identifies the product for which a listing is to be created;

responsive to the presenting the user interface, receiving via the client machine, a listing identification data that identifies the product for which a listing is to be created;

receiving, by the server, via the client machine, from the seller who desires to sell the product, a selection of a product category within which to list the product for sale, wherein the product category comprises a record having a product listing stored therein;

determining that the selected product category is a category which allows automated generation of the proposed listing;

retrieving, based on the listing identification data and on the product category received from the seller, listing data comprising attributes of the product to be listed for sale, from a source of attributes of the product;

automatically generating, using at least one processor, a proposed listing for sale of the product, the proposed listing including the retrieved attributes, the proposed listing being modifiable by a user, via the client machine, by deleting one or more of the attributes that were included as part of the proposed listing, or including one or more attributes that were not included as part of the proposed listing;

presenting the proposed listing at a user interface at the client machine that is configured to modify the proposed listing;

receiving, from the client machine, information corresponding to a user-generated modification of the proposed listing;

creating, based on the received information and the proposed listing, a new listing of the product for sale; and causing the new listing of the product for sale to be posted on a network-based system.

2. The method of claim 1, wherein presenting the proposed listing at a user interface at the client machine that is configured to modify the proposed listing includes presenting a web page that comprises fields that are pre-populated in accordance with the proposed listing.

3. The method of claim 2, wherein the user-generated modification of the proposed listing includes editing of information presented in the fields.

4. The method of claim 1, wherein the presenting the proposed listing at a user interface at the client machine that is configured to modify the proposed listing comprises providing a plurality of check boxes that include:
one or more pre-selected check boxes corresponding to attribute selections that are included in the proposed listing; and
one or more non-selected check boxes corresponding to alternative attribute selections that are not included in the proposed listing.

5. The method of claim 4, wherein the user-generated modification of the proposed listing includes selection of one or more check boxes.

6. The method of claim 1, wherein the listing identification data includes one of a Vehicle Identification Number (VIN), a movie title, a book title or a UPC code; and
wherein the listing identification data includes one of vehicle attributes, details of a movie, or details of a book.

7. One or more computer-readable hardware storage memories having stored therein a set of instructions which, in response to execution by one or more processors of a computer, causes the computer to execute operations comprising:
receiving by a server, via a client machine, from a seller who desires to sell the product, a selection of an option to generate a proposed listing in an automated fashion, the automated fashion comprising adding attributes to the proposed listing without human intervention;
responsive to receiving the selection of the option to generate a proposed listing in automated fashion, presenting a user interface at the client machine for the seller to provide, via the client machine, listing information data that identifies the product for which a listing is to be created;
responsive to presenting the user interface, receiving, via the client machine, a listing identification data that identifies the product for which a listing is to be created;
receiving, by the server, via the client machine, from the seller who desires to sell the product, a selection of a product category within which to list the product for sale, wherein the product category comprises a record having a product listing stored therein;
determining that the selected product category is a category which allows automated generation of the proposed listing;
retrieving, based on the listing identification data and on the product category received from the seller, listing data comprising attributes of the product to be listed for sale, from a source of attributes of the product,
automatically generating, using at least one processor, a proposed listing for sale of the product, the proposed listing including the retrieved attributes, the proposed listing being modifiable by a user, via the client machine, by deleting one or more of the attributes that were included as part of the proposed listing, or including one or more attributes that were not included as part of the proposed listing;
presenting the proposed listing at a user interface at the client machine that is configured to modify the proposed listing;
receiving, from the client machine, information corresponding to a user-generated modification of the proposed listing;
creating, based on the received information and the proposed listing, a new listing of the product for sale; and
causing the new listing of the product for sale to be posted on a network-based system.

8. The one or more computer-readable hardware storage memories of claim 7, wherein presenting the proposed listing at a user interface at the client machine that is configured to modify the proposed listing comprises presenting a web page that comprises fields that are pre-populated in accordance with the proposed listing.

9. The one or more computer-readable hardware storage memories of claim 8, wherein the user-generated modification of the proposed listing includes editing of information presented in the fields.

10. The one or more computer-readable hardware storage memories of claim 7, wherein presenting the proposed listing at a user interface at the client machine that is configured to modify the proposed listing comprises providing a plurality of check boxes that include:
one or more pre-selected check boxes corresponding to attribute selections that are included in the proposed listing; and
one or more non-selected check boxes corresponding to alternative attribute selections that are not included in the proposed listing.

11. The one or more computer-readable hardware storage memories of claim 10, wherein the user-generated modification of the proposed listing includes selection of one or more check boxes.

12. The one or more computer-readable hardware storage memories of claim 7, wherein the listing identification data includes one of a Vehicle Identification Number (VIN), a movie title, a book title or a UPC code; and wherein the listing identification data includes one of vehicle attributes, details of a movie, or details of a book.

13. A system comprising:
one or more computer processors and storage configured to:
receive by a server, via a client machine, from a seller who desires to sell the product, a selection of an option to generate a proposed listing in an automated fashion, the automated fashion comprising adding attributes to the proposed listing without human intervention;
responsive to receipt of the selection of the option to generate a proposed listing in automated fashion, present a user interface at the client machine for the seller to provide, via the client machine, listing information data that identifies the product for which a listing is to be created;
responsive to the presentation of the user interface, receive, via the client machine, a listing identification data that identifies the product for which a listing is to be created;
receive, via the client machine, from the seller who desires to sell the product, a selection of a product category within which to list the product for sale, wherein the product category comprises a record having a product listing stored therein;
determine that the selected product category is a category which allows automated generation of the proposed listing;
receive, via a client machine, from a seller, who desires to sell a product, a product category within which to list the product for sale, wherein the product category comprises a record within a category table within a database associated with the server;
retrieve, based on the listing identification data and on the product category received from the seller, listing data that comprises attributes of the product to be listed for sale, from a source of attributes of the identified product;
generate automatically, by use of at least one processor, a proposed listing for sale of the product, wherein the proposed listing includes the retrieved attributes, and wherein the proposed listing is modifiable by a user, via the client machine, by deletion of one or more of the attributes that were included as part of the proposed listing, or by inclusion of one or more attributes that were not included as part of the proposed listing;
present the proposed listing at a user interface at the client machine that is configured to modify the proposed listing;
receive from the client machine information that corresponds to a user-generated modification of the proposed listing;
create, based on the received information and the proposed listing, a new listing of the product for sale; and
cause the new listing of the product for sale to be posted on a network-based system.

14. The system of claim 13, wherein presentation of the proposed listing at a user interface at the client machine that is configured to modify the proposed listing comprises presentation of a web page with fields that are pre-populated in accordance with the proposed listing.

15. The system of claim 14, wherein the user-generated modification of the proposed listing includes an edit of information presented in fields.

16. The system of claim 13, wherein presentation of the proposed listing at a user interface at the client machine that is configured to modify the proposed listing includes the provision of a plurality of check boxes that include:
one or more pre-selected check boxes that correspond to attribute selections that are included in the proposed listing; and
one or more non-selected check boxes that correspond to alternative attribute selections that are not included in the proposed listing.

17. The system of claim 13, wherein the listing identification data includes one of a Vehicle Identification Number (VIN), a movie title, a book title or a UPC code; and
wherein the listing identification data includes one of vehicle attributes, details of a movie, or details of a book.

* * * * *

UNITED STATES PATENT AND TRADEMARK OFFICE
CERTIFICATE OF CORRECTION

| | | |
|---|---|---|
| PATENT NO. | : 9,704,194 B2 | Page 1 of 1 |
| APPLICATION NO. | : 14/318525 | |
| DATED | : July 11, 2017 | |
| INVENTOR(S) | : Steve Grove et al. | |

It is certified that error appears in the above-identified patent and that said Letters Patent is hereby corrected as shown below:

On the Title Page

In item (57), in Column 2, in "Abstract", Line 5, delete "tier" and insert -- for --, therefor.

In the Claims

In Column 10, Line 61, in Claim 1, delete "receiving" and insert -- receiving, --, therefor.

In Column 12, Line 20, in Claim 7, delete "product," and insert -- product; --, therefor.

In Column 13, Line 38, in Claim 13, after "the" delete "identified".

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*